United States Patent [19]

Schmid

[11] Patent Number: 4,641,892
[45] Date of Patent: Feb. 10, 1987

[54] RAILWAY EMERGENCY BRAKE SYSTEM

[75] Inventor: Hartmut Schmid, North Vancouver, Canada

[73] Assignee: DSL Dynamic Sciences Limited, St. Laurent, Canada

[21] Appl. No.: 680,769

[22] Filed: Dec. 12, 1984

[51] Int. Cl.[4] .......................... B60T 15/42; B60T 15/46
[52] U.S. Cl. .......................................... 303/47; 303/86
[58] Field of Search ....................... 303/15, 16, 20, 50, 303/47, 86

[56] References Cited

U.S. PATENT DOCUMENTS

| | | | |
|---|---|---|---|
| 1,707,273 | 4/1929 | McCune | 303/86 |
| 1,720,267 | 7/1929 | Farmer | 303/47 |
| 1,842,211 | 1/1932 | Slayton | 303/86 |
| 2,061,916 | 11/1936 | Miller | 303/47 X |
| 2,121,774 | 6/1938 | Ham | 303/86 |
| 2,258,783 | 10/1941 | McNeal | 303/47 |
| 3,374,035 | 3/1968 | Howard | 303/20 |
| 3,539,226 | 11/1970 | Barber | 303/20 |
| 4,361,825 | 11/1982 | Shockley | 303/86 X |

FOREIGN PATENT DOCUMENTS

456226 11/1936 United Kingdom ................. 303/86

Primary Examiner—Duane A. Reger
Attorney, Agent, or Firm—Christensen, O'Connor, Johnson & Kindness

[57] ABSTRACT

An emergency brake control valve and a system incorporating the same that enables the locomotive engineer to remotely initiate emergency braking at the rear or any intermediate car of the train. The system includes a master unit that is constructed so as to be mounted in the locomotive of the train and a remote control unit that is constructed so as to be mounted on one of the cars. Preferably, the remote control unit is mounted on the last car so that emergency braking may be initiated at the rear of the train. Actuation by the engineer of an emergency brake switch (20) produces an output signal that is transmitted by a radio transmitter (22) and received by a radio receiver (24) in the remote control unit. In response to the received signal, an actuator (26) is energized to operate a solenoid valve (28) from a normally closed position to an open position to connect a control port (48) of an emergency brake control valve (30) to atmosphere. This produces a pressure differential that causes a movable valve member (70) in the emergency brake control valve to shift to an open position in which the vehicle brake pipe (21) is exhausted to atmosphere through an exhaust port (27, 44). To terminate emergency braking, the solenoid valve is closed. This, in turn, shifts the movable valve member to its closed position so that normal braking activities can be resumed. The invention is adapted for complementary use with a system that monitors and remotely displays a plurality of train status conditions. To enable supply of the brake pipe air pressure to pressure sensors (56, 58) in a train status-monitoring system, the movable valve member (70) has a passageway (81) that provides fluid communication between its primary and secondary sides. When the valve member is in its closed position, the brake pipe air pressure is supplied through this passageway and then through the control port (48) to the pressure sensors for the brake pressure monitor. For use in either a stand-alone system or in conjunction with a remote monitoring system, the emergency brake control valve (30) has a glad-hand connector (34) so that the valve may be coupled directly to the existing glad-hand connection (36) for the brake pipe of the railway vehicle.

17 Claims, 5 Drawing Figures

Fig. 5.

RAILWAY EMERGENCY BRAKE SYSTEM

BACKGROUND OF THE INVENTION

The present invention relates generally to railway fluid pressure brake systems. More particularly, the invention concerns an emergency brake control valve and a system incorporating the same that enables the locomotive engineer to remotely initiate emergency braking at the rear of the train.

In a typical railway train braking system, each vehicle is fitted with a brake pipe, which extends along the length of the vehicle and is coupled to the vehicle's brake cylinders through service and emergency reservoirs and various valves. At each end of the vehicle, the brake pipe is coupled to a "glad-hand" connector through an angle cock and a flexible hose. During assembly of a train, the glad-hand connectors of adjacent vehicles are interconnected to form a continuous brake pipe extending from the locomotive of the train to the last vehicle thereof. The locomotive includes a source of air pressure that is coupled to the locomotive's brake pipe by various valves, including service and emergency control valves accessible to the locomotive engineer.

When the brake pipe interconnections have been made, the angle cock at the far end of the last vehicle is closed and the remaining angle cocks are open to accordingly form a continuous, closed brake pipe extending from the locomotive to the last vehicle. Through the valves of the locomotive, the brake pipe is charged from the source of air pressure to a predetermined pressure value, (e.g., 85 psi). This predetermined brake air pressure causes the pistons in the brake cylinders at each vehicle to be withdrawn to effect a full brake release, and pressurizes the various reservoirs.

When application of either the service brakes or the emergency brakes is desired, the appropriate control valve in the locomotive is actuated by the engineer so as to result in a reduction in brake pipe air pressure at the locomotive, which, thereafter, rapidly propagates along the brake pipe. At each vehicle, the valves sense the differential between the reservoir air pressure and the brake pipe air pressure and apply the brakes in response thereto. For the service brakes, the brakes are applied in proportion to the magnitude of the pressure differential. In order to release the brakes after a brake application, the engineer actuates one of the valves to cause the brake pipe air pressure to be restored to the full release value if a full brake release is desired or to an intermediate value if a partial brake release is desired.

In emergency situations, actuation of the emergency control valve in the locomotive produces a pulse of air that travels from the locomotive rearwardly along the brake pipe. At each vehicle, the valves that control emergency braking sense this pulse and, in response thereto, exhaust air from the brake pipe. This results in full application of the brakes. The braking application mirrors the propagating control pulse, so that emergency braking occurs first at the front of the train and thereafter propagates rearwardly through each vehicle.

Railway braking systems also typically include manually operated valves that are accessible to persons on the rear of a train and that can be actuated to apply the brakes from the rear. These mechanical valves are often employed to manually apply the brakes when the train is backing up. Since such manually operated valves are also typically present on each car of the train, braking can also be manually initiated at each car. While these valves can be used to initiate emergency braking beginning at some point other than the locomotive, they are not usually so employed since operators are not often present on the intermediate cars of the train or on the last car of a cabooseless train. Accordingly, front-of-train initiation of braking remains the sole practical means for effecting emergency braking in known systems.

In most situations, initiating emergency braking at the front of the train is a safe and effective way to fully apply the brakes. A serious and potentially dangerous situation occurs, however, where dirt or debris creates a blockage at some point along the brake pipe. If the blockage is substantial enough to prevent transmission of the propagating control pulse, emergency braking will not occur at those vehicles located rearwardly of the blockage.

From the foregoing, it can be appreciated that it would be extremely useful for the engineer to be able to initiate emergency braking at an intermediate car or the rear of the train in those situations in which an accumulation of dirt or debris in the brake pipe renders the normal front-of-train initiation of emergency braking ineffective. In other emergency braking situations, such as those involving lengthy trains, it would also be desirable to provide the engineer with a choice between initiating emergency braking at the front, rear, or an intermediate position of the train or simultaneously at more than one point. Heretofore, no means have been developed by which such rear-of-train or intermediate car emergency braking may be initiated.

SUMMARY OF THE INVENTION

The present invention provides a system for remotely initiating emergency braking at one of the cars of a train, where each of the cars has a brake pipe with a glad-hand connection thereto. The system comprises a master unit that is constructed so as to be mounted in the locomotive of the train, and a remote control unit that is constructed so as to be mounted on one of the cars. Preferably, the remote control unit is mounted on the last car so that emergency braking may be initiated at the last car and allowed to propagate forwardly through each of the other cars. The master unit includes manually actuatable means for providing an output signal that is indicative of a desired emergency brake application, and means for transmitting the output signal.

The remote control unit includes valve means, which are coupled to the brake pipe of the car on which the remote control unit is mounted, and which selectively provide communication between the brake pipe and atmosphere. The remote control unit further includes means for receiving the output signal from the master unit and, in response thereto, actuating the valve means to establish the communication between the brake pipe and atmosphere.

In a preferred embodiment, the valve means includes an emergency brake control valve that has a glad-hand connector and a quick-exhaust valve. The glad-hand connector is coupled with the existing glad-hand connection to the brake pipe of the vehicle on which the remote control unit is mounted. Upon receipt of the emergency brake indicating output signal, the quick-exhaust valve is triggered to an open position that releases air from the brake pipe, resulting in initiation of emergency braking at that car. The reduction in brake pipe air pressure at this car thereafter propagates along the brake pipe to the remaining cars, initiating further emergency braking.

In preferred form, the quick-exhaust valve is operable between an open position and a closed position to control communication between the brake pipe and atmosphere through a connecting passageway in the glad-hand connector. In a preferred embodiment, the quick-exhaust valve has a movable valve member with opposed primary and secondary sides. In the closed position, the primary side of the valve member is seated against a primary valve seat to close the passageway of the glad-hand connector, and thus prevent communication between the brake pipe and atmosphere. In the open position, the primary side of the valve member is unseated from the primary valve seat to establish a fluid path to atmosphere through an exhaust port provided on the glad-hand connector. The valve member is movable to the open position in response to a difference between a pressure acting on its primary side and a pressure acting on its secondary side. This pressure differential is established by control valve means that communicate with the secondary side of the movable valve member through a control port in the quick-exhaust valve. In preferred form, the control valve means includes a solenoid valve that is operable to selectively establish communication between the secondary side of the movable valve member and atmosphere.

The system can be configured in a stand-alone manner by providing an RF transmitter and a suitable emergency braking switch in the locomotive and, by providing at the remote car, an RF receiver, the emergency brake control valve, an actuating device such as a relay or a solid state device, the solenoid valve, and a battery. The emergency braking switch may be a separate pushbutton or a contact, such as one that is associated with and actuated by the brake lever of the train. Alternately, a pressure sensor or an arrangement of pressure sensors which sense the pressure within the brake pipe may be used to automatically trigger the initiation of emergency braking at the remote car. There has been, however, increase interest in equipment that transmits train status information from the rear of the train to the locomotive. It would be particularly desirable to integrate the present emergency braking system into a system that monitors and remotely displays a plurality of train status conditions. A known monitoring system provides an indication of various conditions, among which are brake pipe air pressure; state of motion, i.e., an indication when the last car begins to move and its direction; and distance travelled. In order to integrate the present emergency braking system into such a rear-of-train telemetry system, measures must be taken to ensure that the brake pipe air pressure is supplied to the sensors in the brake pressure monitor during normal, i.e., non-emergency, braking conditions and immediately after an emergency braking condition. To satisfy these objectives, the inventive emergency control valve is preferably configured to perform its remote emergency brake function in emergency situations and, in normal braking situations, to supply the brake pipe air pressure to the pressure sensors that provide input to the train status-monitoring system. According to this aspect of the invention, the movable valve member in the quick-exhaust valve has a passageway that provides fluid communication between the primary and secondary sides. When the valve member is in its closed position, the brake pipe air pressure is supplied through this passageway, thence through the control port to the pressure sensors for the brake pressure monitor. In the preferred embodiment, the solenoid valve that controls the quick-exhaust valve shares a common fluid connection with the pressure transducers of the monitor. This common connection is normally closed so that the brake pipe air pressure transmitted through the passageway in the movable valve member can be reliably measured. To initiate emergency braking, the solenoid is activated to vent the common connection to atmosphere. This results in a rapid reduction in pressure on the secondary side of the valve member, which opens the valve, venting the brake pipe to atmosphere through the exhaust port in the quick-exhaust valve. To return to a normal condition after emergency braking, the solenoid valve is closed. Thereupon, the valve member moves to its closed position and the brake pipe air pressure is once again supplied to the pressure sensors via the passageway in the valve member and the common fluid connection.

BRIEF DESCRIPTION OF THE DRAWINGS

The invention can best be understood by the following portion of the specification taken in conjunction with the accompanying drawings in which.

DETAILED DESCRIPTION OF THE PREFERRED EMBODIMENT

Figures 1, 2:
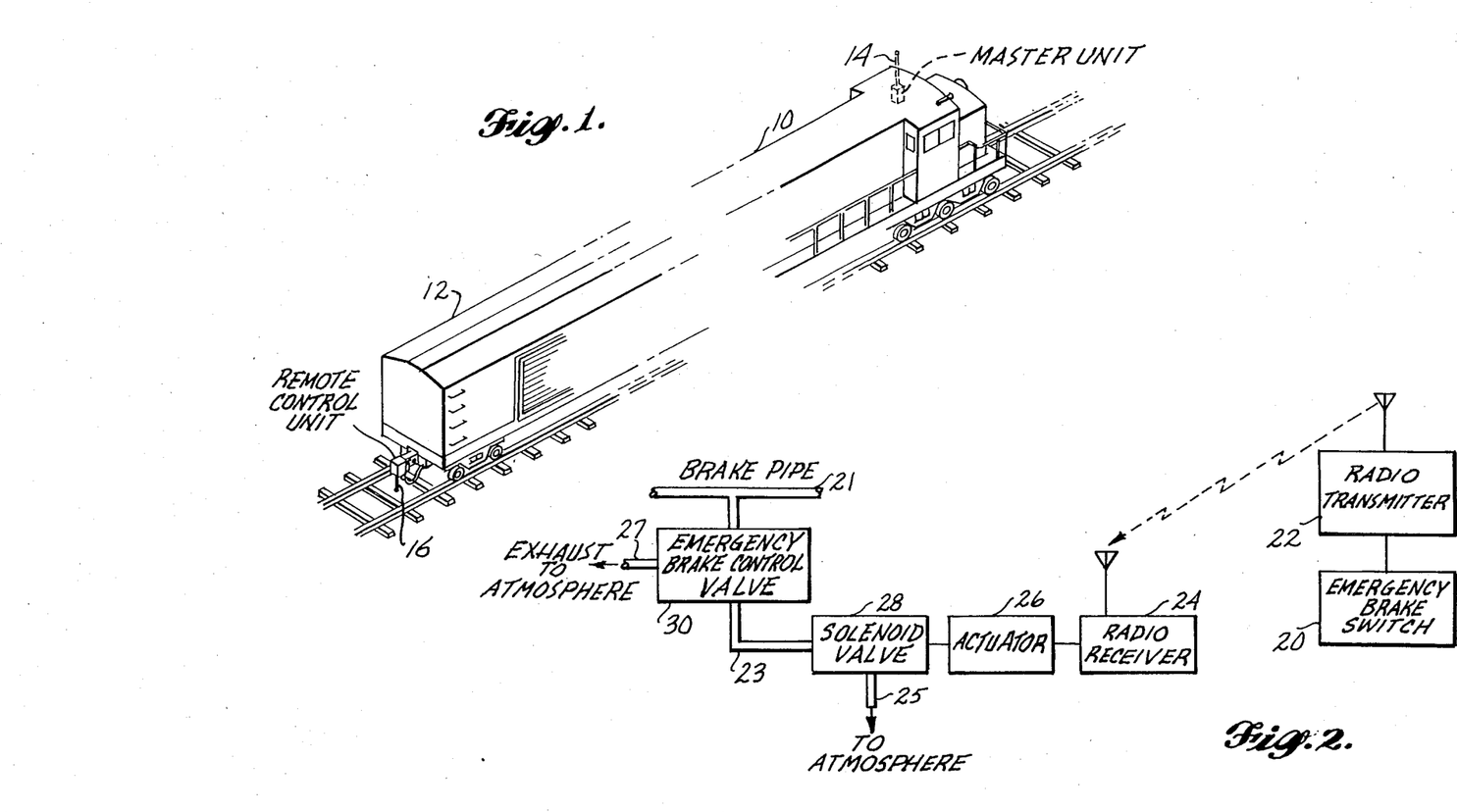
FIG. 1 is a pictorial view of a locomotive and of the last vehicle of a train, illustrating a master unit located in the locomotive cab and a remote control unit located at the last vehicle.
FIG. 2 is a schematic block diagram of the inventive system for remotely initiating emergency braking.

Referring to FIG. 1, the inventive system for remotely initiating emergency braking includes a master unit mounted in the cab of a locomotive 10 in a location accessible to the locomotive engineer, and a remote control unit mounted on the rear coupler of the last vehicle 12 of the train pulled by the locomotive 10. The master unit and the remote control unit are provided with respective antennas 14, 16 for providing radiofrequency communications therebetween. Using the existing brake system of the train (not shown) the engineer can control normal activities, including the front-of-train initiation of emergency braking at the locomotive. If initiation of emergency braking at the last vehicle is desired, the engineer actuates the master unit to transmit a control signal to the remote control unit. The remote control unit is coupled to the brake pipe of the last vehicle 12 and, in turn, to the train's continuous brake pipe provided by the interconnection of the individual brake pipes of the remaining vehicles in the train. The remote control unit functions to receive the signal received from the master unit and, in response thereto, to exhaust the brake pipe of vehicle 12 to atmosphere. Emergency braking thus begins at the last car 12 and propagates forward through the remaining cars in the train.

Referring now to FIG. 2, the master unit includes an emergency brake switch 20 that provides an output signal indicative of a desired emergency brake application beginning at the last vehicle 12. Radio transmitter 22 modulates this output signal onto an RF carrier signal and transmits the same to the radio receiver 24 of the remote control unit. Radio receiver 24 demodulates the modulated RF carrier signal and provides a signal that energizes actuator 26, which may be a relay or a suitable solid state device. The output of actuator 26 is coupled to a two-way solenoid valve 28, which controls the operation of an emergency brake control valve 30. In a first position, solenoid valve 28 maintains emergency brake control valve 30 in a normally closed position in which the charge of air pressure within brake pipe 21 is unaffected, i.e., is at a level determined by the existing brake system of the train. Upon receipt of the signal indicating the initiation of emergency braking, solenoid valve 28 is operated to a second position in which a control port in emergency brake control valve 30 is vented to atmosphere through conduit 23 and through port 25. This causes emergency brake control valve 30 to shift to an open position in which brake pipe 21 is exhausted to atmosphere through exhaust port 27. To terminate the emergency braking, the connection of the solenoid valve 28 to atmosphere is closed. This, in turn, effects a closing of the exhaust port 27 of the emergency brake control valve, which permits normal recharging of the brake pipe 21 and resumption of normal braking activities.

The system just described can be configured as a "stand-alone" system with a dedicated radio transmitter and a dedicated radio receiver. Such an arrangement would be employed where it is desired only to provide the engineer with the ability to initiate remote emergency braking. As noted above, there exist systems for transmitting rear-of-train operational data for display to the engineer. Such a system for providing informational reports concerning train status conditions is disclosed in U.S. patent application Ser. No. 495,714, filed May 18, 1983, now U.S. Pat. No. 4,487,060. The system disclosed in this application, among other things, monitors and remotely displays the air pressure in the brake pipe of a railway train. The railway brake pressure monitor includes a receiver, or remote, display unit (RDU) mounted in the cab of a locomotive in a location that is accessible to the locomotive engineer, and a sensor/-transmitter unit (STU) mounted on the rear coupler of the last vehicle of the train pulled by the locomotive. The STU has a radio transmitter and the RDU has a radio receiver so that radiofrequency communications can be provided therebetween. The STU is coupled to the train's brake pipe at the rear of the last vehicle in order to measure the brake pipe air pressure. The STU also functions to monitor various external status inputs provided by other sensors, and to transmit the measured brake pipe air pressure and monitored external status inputs, along with other information to the RDU. The RDU, in turn, functions to display the data received from the STU and to provide various alerts and alarms, with the displays, alerts, and alarms being provided in the manner designed to assist the locomotive engineer in the use of the railway train braking system. The STU includes a pressure transducer, a pressure switch, an electronic circuit board module, and a radio transmitter, each of which is powered by a battery pack. The electronic circuit board module includes a programmed microcomputer that functions to repetitively monitor the pressure transducer, to measure the brake pipe air pressure, and to cause the radio transmitter to transmit reports including brake pipe air pressure, the states of the external status inputs, and a battery status indication. Report transmission is triggered by various events, including changes in the brake air pressure and external status inputs since the last report. The remote display unit includes a radio receiver, a microcomputer, a display, an audible beeper, and a manually actuatable pushbutton. The RDU functions to receive the report and display the various information contained therein.

The components of the STU are mounted in and on a housing that can be readily mounted and removed from the coupler at the rear of the last vehicle. To provide the brake pipe air pressure as input to the pressure transducer, a glad-hand connector is provided on the bottom of the housing. This glad-hand connector is adapted to mate with the existing glad-hand connector of the last vehicle that is coupled to the brake pipe through a flexible hose and angle cock. When the two glad-hand connectors are assembled and the angle cock is open, the STU is in fluid communication with the brake pipe.

The present invention is advantageously adapted for complementary use with the railway brake pressure monitor described in the abovereferenced patent application. As will become apparent from the discussion hereinafter, the emergency brake valve 30 can be configured to perform its emergency braking function while at the same time providing the means for establishing fluid communication between the brake pipe and STU for pressure measurement purposes. By mounting the radio receiver 24, actuator 26, and solenoid valve 28 in the STU housing and by making the appropriate pneumatic and electrical connections, the remote control unit of the present system can be physically a part of the STU and readily mounted on and removed from the last vehicle.

Figure 4:
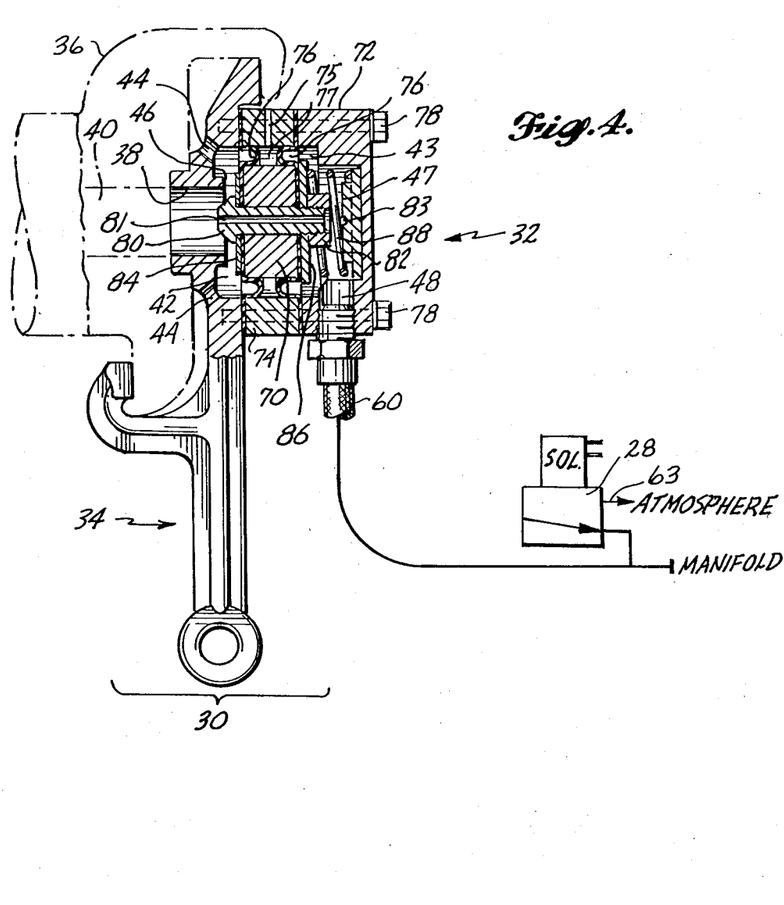
FIG. 4 is a side view in partial section of the valve of FIG. 3.
Figure 5:
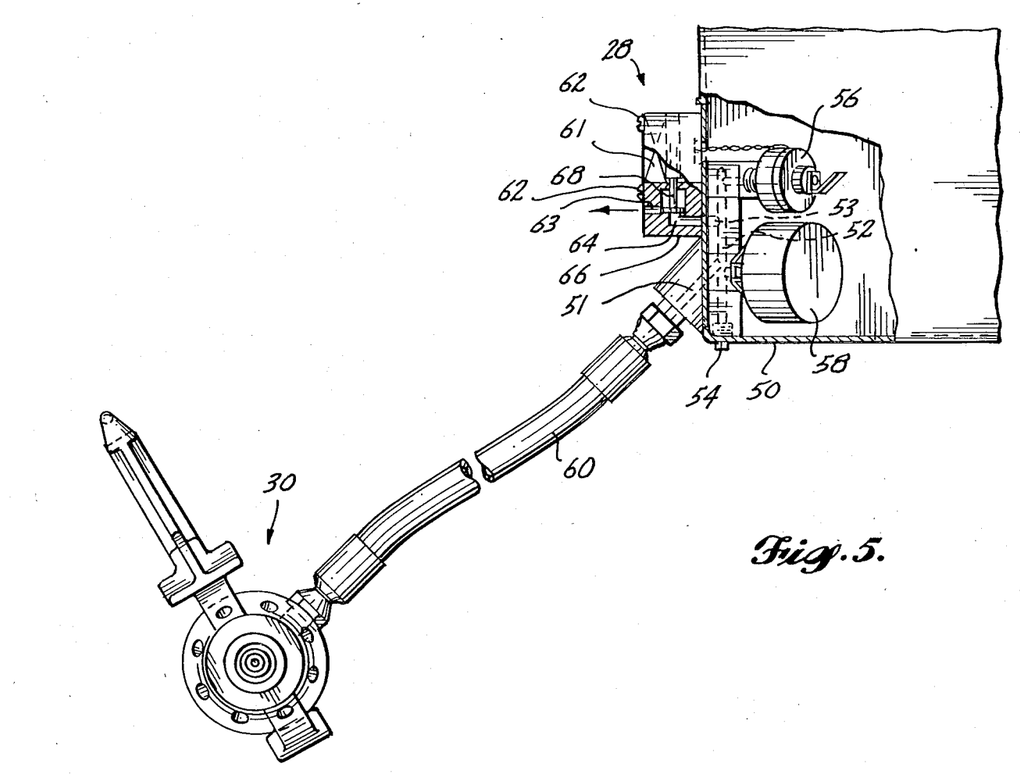
FIG. 5 is a view in partial section showing the integration of the emergency brake control valve and the solenoid valve into a train statusmonitoring system.

Referring now to FIG. 5, the emergency brake control valve 30 and the solenoid valve 28 of the present invention are connected to a modified version of the STU housing illustrated in the above-referenced patent application. In this version, the STU components are mounted within a die-cast aluminum housing 50. Since the pneumatic connections are of principal interest here, only a portion of the housing 50 is shown in FIG. 5. A manifold 52 is formed within the housing 50 and enclosed by a plug 54. The pressure switch 56 and pressure transducer 58 of the STU are in fluid communication with the manifold 52 so as to be subjected to the brake pipe air pressure when the system is coupled to the brake pipe of a railway vehicle. External fluid communication with the manifold is provided through an inlet 51. The outer end of the inlet 51 is threaded and receives a flexible airhose 60. The emergency brake control valve 30 of the present invention is connected to the opposite end of the flexible hose 60 in a manner that will be described in greater detail in conjunction with FIG. 4.

Solenoid valve 28 is attached to the housing 50 by a suitable number of mounting screws 62. The solenoid valve includes an inlet port 64 that is in fluid communication with a spur 53 of the manifold 52. An O-ring 66 seals the connection between the inlet port 64 and spur 53. The solenoid valve is of conventional design, having a plunger 68 that is movable into and out of seated, closed engagement with the inlet port 64 in response to an electric current sent through coil 61. When plunger 68 is unseated from the inlet port 64, manifold 52 communicates with atmosphere through an exhaust port 63 of the solenoid valve. The seating and unseating of the solenoid valve, and hence the connection to atmosphere of the fluid path through the airhose 60 and manifold 52 controls the operation of the emergency brake control valve 30. When an emergency brake application is indicated by the signal initiated remotely in the locomotive cab, the coil 61 of the solenoid valve is energized by relay 26 (not shown in FIG. 5) to lift plunger 68 and communicate the control portion of the emergency brake control valve 30 with atmosphere.

It is to be appreciated that the solenoid valve can be configured and connected in a variety of ways to perform its venting function. For example, the entire valve body could be formed as part of the same housing that contains the manifold 52.

Figure 3:
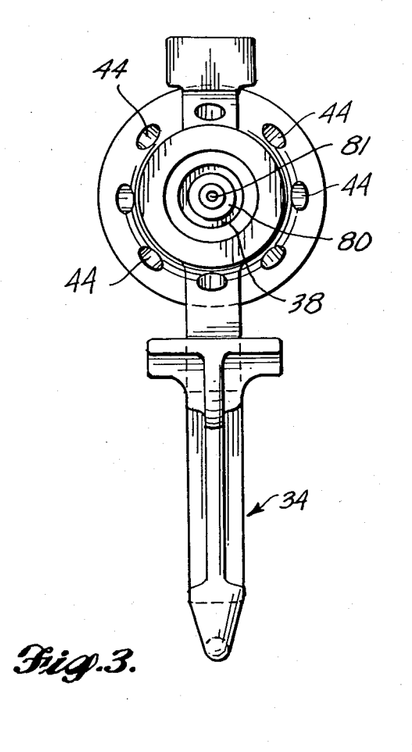
FIG. 3 is a front view of the emergency brake control valve.

Referring now to FIGS. 3 and 4, the emergency brake control valve 30 has a remotely triggerable quick-exhaust valve 32 connected to a glad-hand body 34. The glad-hand body 34 is a single die-cast aluminum piece that is configured for mating connection with a standard railway glad-hand, or bayonet, connector 36 (shown with broken line in FIG. 4). Although shown in simplified form for purposes of illustration, glad-hand connector 36 is of conventional design and of the type that is connected at the free end of a flexible hose, which is connected at its other end through an angle cock to the brake pipe of a railway vehicle. When glad-hand body 34 and glad-hand connector 36 are joined, an inlet passageway 38 of the glad-hand body communicates with the brake pipe of the vehicle through a passageway 40 in glad-hand connector 36 and through the flexible hose and angle cock (not shown in FIG. 4).

The connection between glad-hand body 34 and the glad-hand connector 36 of the railway vehicle is an arrangement that is particularly well suited for use in connecting the emergency brake control valve to the last vehicle of the train so as to be able to initiate rear-of-train emergency braking. Where it is desired to provide the ability to remotely initiate emergency braking at some intermediate car, it will be apparent that the glad-hand connector of the chosen car will now be "available" for attaching to the glad-hand body of the emergency brake control valve. Rather, the glad-hand connector of the intermediate car will be normally attached to the glad-hand connector of the immediately adjacent car. In such a situation, it is necessary to provide a suitable connection that provides continuity between the brake pipes of the vehicles as well as a connection for the emergency brake control valve. This may be accomplished in a number of ways, which will be quite apparent to those skilled in the art. By way of example, an appropriately configured T-connection having appropriately configured glad-hand connections would receive the glad-hand connectors of each of the cars and the glad-hand body 34 of the emergency brake control valve 30.

The interior face of the glad-hand body 34 is recessed to form a primary chamber 42. Communication between primary chamber 42 and atmosphere is provided through a plurality of exhaust ports 44 that are radially disposed about the outer face of the glad-hand body 34. As will be described in greater detail hereinafter, the quick-exhaust valve 32 has a valve member 70 that is movable between an open and closed position to control communication between the passageway 38 of the glad-hand body 34 and atmosphere through exhaust ports 44. In FIG. 4, valve member 70 is shown in an intermediate position unseated from a primary valve seat 46 on the glad-hand body 34. In operation, as the valve member moves through this not yet fully open position, communication already exists between the passageway 38 and atmosphere so that fluid pressure within the brake pipe of the vehicle is being released. It will be observed that the use of a number of radially positioned exhaust ports serves to diffuse the blast of air that results when the brake pipe is vented. Although a single exhaust port could be utilized, the plural arrangement is preferred for safety reasons to minimize the likelihood that debris will be thrown upon actuation of the quick-exhaust valve.

The valve member 70 is supported for movement by a pair of rolling diaphragms 76, which may be constructed of an elastomeric material. The outer edges of the rolling diaphragms 76 are secured in sandwich-like manner by a spacer ring 74 and an end cap 72. The assembly of rolling diaphragms, spacer ring, and end cap is connected by a suitable number of screws 78, which are received in threaded receptacles in the glad-hand body 34. When so assembled, the rolling diaphragms seal the various joining faces of the glad-hand body, spacer ring, and end cap. The spacer ring has a vent 75 that communicates the annular space 77 to atmosphere. In the event of slight leakage through the diaphragms, this venting arrangement ensures that no pressure differential will build up between the diaphragms and adversely affect operation of the valve. It is to be noted that other arrangements could be utilized to provide a movable abutment that is seated and unseated from the primary valve seat 46. For example, only a single diaphragm or a piston could be employed. Diaphragms are preferred, and in particular the two diaphragms illustrated in FIG. 4, since it is quite common to encounter dirt and other debris in the brake lines of railway vehicles. With diaphragms, it is less likely that the moving components of the valve would stop functioning because of an accumulation of dirt or debris.

The two diaphragms 76 are secured to the valve member 70 by a central assembly screw 80 and a nut 82. On a primary side of the valve member, the enlarged head of the central assembly screw clamps one of the rolling diaphragms 76 and a primary valve gasket 84 in place. On the opposite, secondary side of the valve member, the nut clamps a disc 86 and the other diaphragm in place. A valve spring 88 acts against the disc 86 to normally bias the valve member and the components assembled thereto in a closed position to the left of the intermediate position shown in FIG. 4. In this closed position, the primary valve gasket is seated on the primary valve seat 46 to prevent communication between the passageway 38, and hence the brake pipe of the vehicle, and atmosphere through the exhaust ports 44. In this closed position, the brake pipe air pressure acts upon the portion of the primary valve gasket 84, which is exposed to the passageway 38. As well, the brake pipe air pressure is also supplied to a secondary chamber of the valve through an orifice, or passageway, 81 through the central assembly screw 80. The passage of the brake pipe air pressure through the orifice 81 accomplishes several functions. First, in the normal situation, i.e., nonemergency brake condition, with the valve member to the left in the closed, seated position, and with the secondary chamber being effectively closed by operation of the solenoid valve 28, equal pressure exists on the primary and secondary sides of valve member 70. It will be observed, however, that this pressure acts upon a larger surface area on the secondary side of the valve member 70. In a preferred arrangement, in this closed position, the surface area exposed to the brake pipe air pressure on the secondary side is approximately twice the surface area on the primary side. As a result, substantially greater forces, including the force of the spring 88, act on the secondary side to firmly hold the valve in the closed position during normal operation. Accordingly, the valve will not inadvertently open in response to changes in brake pipe air pressure occasioned by normal braking activities.

When the valve is to be used in conjunction with a brake pressure monitor, the orifice 81 permits passage of the brake pipe pressure onto the pressure sensors in the monitor. This can be seen in FIGS. 4 and 5, in which the pressure is supplied through airhose 60, which is connected at one end to an inlet port in the quick-exhaust valve 32 and at the other end to the inlet 51 of manifold 52. For clarity of illustration, this arrangement is only schematically shown in FIG. 4. As was discussed in connection with FIG. 5, solenoid valve 28 is remotely triggered when an emergency brake application is desired. This connects the secondary chamber 43 to atmosphere. The pressure on the secondary side of the valve thus begins to decrease. It will be noted that a controlled amount of pressure within the brake pipe itself is also initially released through the orifice 81 before the valve actually opens. When the difference between the pressures acting on the primary and secondary side reaches the desired limit, the valve is shifted to the open position in which the nut 82 seats firmly against a disc-shaped secondary valve seat 47. The brake pipe pressure is then released through the exhaust ports 44. As this pressure is being exhausted, the pressure on the primary side will also continue to hold the valve in the open position as the pressure bleeds from the brake pipes of other vehicles that are interconnected with the brake pipe of the vehicle on which the valve is mounted. When the solenoid valve 28 is switched to its closed position, pressure begins to build up again in the secondary chamber 43 via the orifice 81. This pressure, with the assistance of the spring 88 returns the valve member to its normally closed position.

To ensure that the valve remains fully open while exhausting is taking place, a flow control groove 83 is provided on the secondary valve seat 47. This groove extends from the center of the secondary valve seat radially outward to the edge. When the valve is in the fully opened position, the flow control groove 83 restricts the amount of air that can pass through the orifice 81 and out to atmosphere through the exhaust port 63 of the solenoid valve. This assists in dropping the pressure on the secondary side of the valve member even further to ensure that the valve remains fully opened.

As a precautionary measure, it may be desirable to protect the orifice 81 from being clogged with dirt or debris within the brake pipes. To provide this protection, a filter or screen may be placed on the enlarged head of the central assembly screw 80 so as to cover the entrance to orifice 81. Alternately, a needle may be affixed to the secondary valve seat 47 and oriented so as to pass through orifice 80 whenever the valve opens.

From the foregoing, it will be appreciated that the invention provides a means for initiating emergency braking at an intermediate car or the last car of a train by remotely triggering a release of brake pipe air pressure. The invention further provides means for simultaneously enabling remotely triggered emergency braking and remote monitoring of brake pipe air pressure. The invention may be used on any railway vehicle, either as a stand-alone unit or as part of a system that monitors a variety of operating conditions within the vehicle. It is useful either as supplementary, backup system for the existing front-initiated emergency braking system, or as an additional, complementary system that is used in conjunction with the existing system.

While the invention has been described with reference to a preferred embodiment, it is to be understood by those skilled in the art that the invention is not limited thereto, and that the scope of the invention is to be interpreted only in conjunction with the following claims.

What is claimed is:

1. An emergency brake control valve for a railway vehicle, said valve comprising:
   a glad-hand body having an exterior face and an interior face that are opposed to one another, said exterior face being configured for mating connection with a glad-hand connection to the brake pipe of a railway vehicle, said glad-hand body including a passageway that extends between said faces, said passageway communicating with said brake pipe when said glad-hand body is connected to said glad-hand connection, said glad-hand body having a primary valve seat on the interior face thereof adjacent said passageway, said glad-hand body having an exhaust port that extends between said faces; and
   a quick-exhaust valve mounted on the interior face of said glad-hand body, said quick-exhaust valve having a movable valve member having a primary side and a secondary side that are opposed to one another, in a closed position said primary side being seated against said primary valve seat to close the passageway of said glad-hand body and thereby prevent communication between said passageway and atmosphere, in an open position said primary side being unseated from said primary valve seat to establish a fluid path to atmosphere from said passageway through said exhaust port, said valve member normally occupying the closed position and being movable to the open position in response to a difference between a pressure acting on said primary side and a pressure acting on said secondary side.

2. An emergency brake control valve for a railway vehicle, said valve comprising:
   a glad-hand body having an exterior face and an interior face that are opposed to one another, said exterior face being configured for mating connection with a glad-hand connection to the brake pipe of a railway vehicle, said glad-hand body including a passageway that extends between said faces and that communicates with said brake pipe when said glad-hand body is connected to said glad-hand connection, the glad-hand body having a primary valve seat on the interior face thereof adjacent said passageway, said interior face being recessed around said primary valve seat to form a primary chamber, said glad-hand body including an exhaust port that provides continuous fluid communication between said primary chamber and atmosphere; and a quick-exhaust valve mounted on the interior face of said glad-hand body, said quick-exhaust valve comprising a valve body having a valve member movably mounted therein by at least one rolling diaphragm, said valve body having a primary side and a secondary side that are opposed to one another, in a closed position said primary side being seated against said primary valve seat to close the passageway of said glad-hand body and thereby prevent communication between said passageway and atmosphere, in an open position said primary side being unseated from said primary valve seat to establish a fluid path to atmosphere from said passageway through said primary chamber and exhaust port, said quick-exhaust valve having a secondary chamber, one side of which is defined by the diaphragm and the secondary side of said valve body, said quick-exhaust valve including a control port that provides fluid communication with said secondary chamber.

3. The valve of claim 2, wherein said movable valve member has a passageway extending between said primary and secondary side, said passageway being arranged to provide fluid communication between the secondary chamber of said valve and the passageway of said glad-hand body when said valve is in its closed position.

4. The valve of claim 3, wherein said quick-exhaust valve has a secondary valve seat against which the secondary side of said valve body seats in the open position, said secondary valve seat being disposed in the secondary chamber opposite said primary seat, said secondary seat having a channel that cooperates in the open position with the passageway in said valve body to provide a controlled rate of fluid flow from the primary side of said valve body into said secondary chamber.

5. The valve of claim 1, wherein said quick-exhaust valve includes a control port that provides fluid communication with the secondary side of said movable valve member, and wherein said movable valve member has a passageway that provides fluid communiction between said primary and secondary sides.

6. The valve of claim 5, wherein said glad-hand connector includes a plurality of exhaust ports, and wherein, in the open position, the primary side of said valve member is unseated from said primary valve seat to establish a plurality of fluid paths to atmosphere from said passageway through said plurality of exhaust ports.

7. The valve of claim 5, wherein said quick-exhaust valve has a secondary valve seat against which the secondary side of said movable valve member seats in the open position, said secondary valve seat being disposed opposite said primary valve seat and having a channel that cooperates in the open position with the passageway in said movable member to provide a controlled rate of fluid flow between the primary and secondary sides of said movable valve member.

8. The valve of claim 7, wherein said quick-exhaust valve includes a spring, said spring acting on the secondary side of said valve member to bias said valve member in the normally closed position.

9. The valve of claim 7, further including control valve means connected to said control port for reducing pressure on the secondary side of said movable valve member to move said valve member to the open position.

10. The valve of claim 9, wherein said control valve means is operable to selectively establish communication between said secondary side of the movable valve member and atmosphere.

11. The valve of claim 10, wherein said control valves means includes a solenoid valve.

12. A system for monitoring brake pipe pressure and for remotely initiating emergency braking at one of the cars of a train, said car having a brake pipe with a glad-hand connection thereto, said system comprising:

a master unit constructed so as to be mounted in the locomotive of said train, said master unit including: means for providing an emergency brake signal that is indicative of a desired emergency brake application, and means for transmitting said emergency brake signal;

pressure transducer means for providing a brake pipe output signal indicative of the level of air pressure within the brake pipe of said car, said pressure transducer means being configured so as to be mounted on said car; and a remote control unit constructed so as to be mounted on said car, said remote control unit including an emergency brake control valve, said valve having a glad-hand body and a quick-exhaust valve, said glad-hand body being configured for complementary mating connection to the glad-hand connection of the brake pipe of said car, said quick-exhaust valve being mounted on said glad-hand body and operable to selectively provide communication between said brake pipe and atmosphere, said remote control unit including means for receiving said emergency brake signal and actuating said quick-exhaust valve in response thereto, said quick-exhaust valve including means for supplying the pressure within said brake pipe to said pressure transducer means.

13. The system of claim 12, wherein said quick-exhaust valve includes a movable valve member, said movable valve member being operable between an open position and a closed position to control communication between said brake pipe and atmosphere, said valve member normally occupying the closed position to prevent said communication, said valve member being operable to the open position to provide said communication, and wherein said movable valve member has a passageway through which pressure in said brake pipe is supplied to said pressure transducer means when said movable valve member is in its closed position.

14. In combination with the system of claim 13, a sensor/transmitter unit of a railway brake pressure monitor, said sensor/transmitter unit including a housing, said pressure transducer means being mounted upon said housing.

15. The system of claim 14, wherein said means for receiving and actuating are mounted upon the housing of said sensor/transmitter unit, and wherein said means for supplying includes a flexible hose secured at one end thereof to said housing, said quick-exhaust valve and glad-hand body being disposed at the other end of said flexible hose.

16. A system for monitoring brake pipe pressure and for remotely initiating emergency braking at one of the cars of a train, said car having a brake pipe with a glad-hand connection thereto, said system comprising:

a sensor/transmitter unit of a railway brake pressure monitor, said sensor/transmitter unit being configured so as to be mounted on said car and being operable to measure the pressure in the brake pipe of said car and provide an output signal indicative of the value thereof;

a master unit constructed so as to be mounted in the locomotive of said train, said master unit including: means for providing an emergency brake signal that is indicative of a desired emergency brake application, and means for transmitting said emergency brake signal; and a remote control unit constructed so as to be mounted on one of said cars, said remote control unit including an emergency brake control valve, said emergency brake control valve having a glad-hand connector and a quick-exhaust valve, said glad-hand connector being coupled with the glad-hand connection to said brake pipe, said quick-exhaust valve being operable to selectively provide communication between said brake pipe and atmosphere, said remote control unit including means for receiving said emergency brake signal and actuating said quick-exhaust valve in response thereto, said quick-exhaust valve including means for supplying the pressure within said brake pipe to said sensor/transmitter unit.

17. The system of claim 16, wherein said emergency brake control valve includes a movable valve member, said movable valve member having a passageway through which pressure in said brake pipe is supplied to said sensor/transmitter unit.

* * * * *

UNITED STATES PATENT AND TRADEMARK OFFICE
CERTIFICATE OF CORRECTION

PATENT NO. : 4,641,892

DATED : February 10, 1987

INVENTOR(S) : Hartmut Schmid

It is certified that error appears in the above-identified patent and that said Letters Patent is hereby corrected as shown below:

Abstract, line 35: "then" should be -- thence --.

Column 3, line 43: "increase" should be -- increased --.

Column 4, line 40: "statusmonitoring" should be -- status-monitoring --.

Column 6, line 25: "abovereferenced" should be -- above-referenced --.

Column 11, line 23: "side" should be -- sides --; and line 41: "communiction" should be -- communication --.

Column 12, line 3: "valves" should be -- valve --.

Signed and Sealed this

Fifteenth Day of September, 1987

Attest:

DONALD J. QUIGG

Attesting Officer   Commissioner of Patents and Trademarks